C. CONNOR.
BRICK CONVEYER.
APPLICATION FILED OCT. 28, 1914.

1,254,204.

Patented Jan. 22, 1918.
6 SHEETS—SHEET 2.

Witnesses

Inventor
C. Connor
By
Attorney

UNITED STATES PATENT OFFICE.

CHARLES CONNOR, OF REDFIELD, SOUTH DAKOTA.

BRICK-CONVEYER.

1,254,204.  Specification of Letters Patent.  Patented Jan. 22, 1918.

Application filed October 28, 1914. Serial No. 869,129.

*To all whom it may concern:*

Be it known that I, CHARLES CONNOR, a citizen of the United States, residing at Redfield, in the county of Spink and State of South Dakota, have invented certain new and useful Improvements in Brick Conveyers; and I do hereby declare the following to be a full, clear, and exact description of the invention, such as will enable others skilled in the art to which it appertains to make and use the same.

This invention relates to a conveyer structure which is designed for use in connection with brick cutting machines, in lieu of the usual off bearing belt which carries the formed brick from the cutter or brick machine, and the primary object of the invention is to provide a conveyer structure as specified, upon which brick carrying pallets are fed, so that the brick, upon issuing from the brick forming or cutting machine will be passed upon a pallet carried by the conveyer and which conveyer will carry the loaded pallet to a desired point, from which they may be manually carried to a drying shed.

Another object of this invention is to provide a conveyer as specified which is operated from the tumble shaft of a rotary brick cutting machine and which conveyer is geared so that the pallet carried thereby will move at a rate of speed sufficient to allow the brick fed from the brick cutting or forming machine to be spaced approximately one-half inch apart upon the pallet to allow air circulation about the bricks for drying them.

A still further object of this invention is to provide means for automatically feeding pallets to the conveyer, and also means for forcing the pallets laterally from the conveyer at its delivery end, from where the pallets are carried to the usual type of drying shed.

In brick forming machine construction now in use, the bricks are fed from the cutting or forming machine upon what is commercially called an off bearing belt, the bricks are removed by hand from this belt and placed in spaced relation on pallets after which the pallets of bricks are carried to a drying shed where they dry, prior to being burned in the kiln, and it is to eliminate the tedious operation of manually removing the formed bricks from the off bearing belt and spreading them upon the pallet and for expediting this branch of brick making work, that the above specified conveyer structure is provided.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which.

Referring more particularly to the drawings, 1 and 2 designate the supporting legs of the brick spreading machine, which legs are secured in any suitable manner, to the sides 3 and 4 of the supporting casing. The sides 3 and 4 of the supporting casing or structure have shafts 5 and 6 rotatably journaled in suitable bearings carried thereby, adjacent to the ends of the supporting casing. Sprockets 7, are mounted upon the shafts 5 and 6, about which sprockets an endless conveyer structure 8 travels. The endless conveyer structure 8 is composed of a plurality of sections 9, which sections are in turn composed of links 10 and 11, that are connected by flat plates 12. The plates 12 are secured to the upper edges of the links 10 and 11, they are narrower than the length of the links, so that when the links are pivotally connected in chain formation, the plates 12 will be spaced from each other, as clearly shown in Figs. 1 and 2 of the drawings. The plates 12 are provided for supporting the brick carrying and receiving pallets. The links 10 and 11 are connected in chain formation by pins 14, and certain of these pins, at spaced intervals about the length of the conveyer have rollers 15 mounted thereon. The rollers 15 ride in guideways 16 which are formed along the upper and lower edges of the side plates 3 and 4, upon the inner surfaces of these plates, the rollers riding in the guideways 16 prevent the endless conveyer from sagging.

Figure 5:
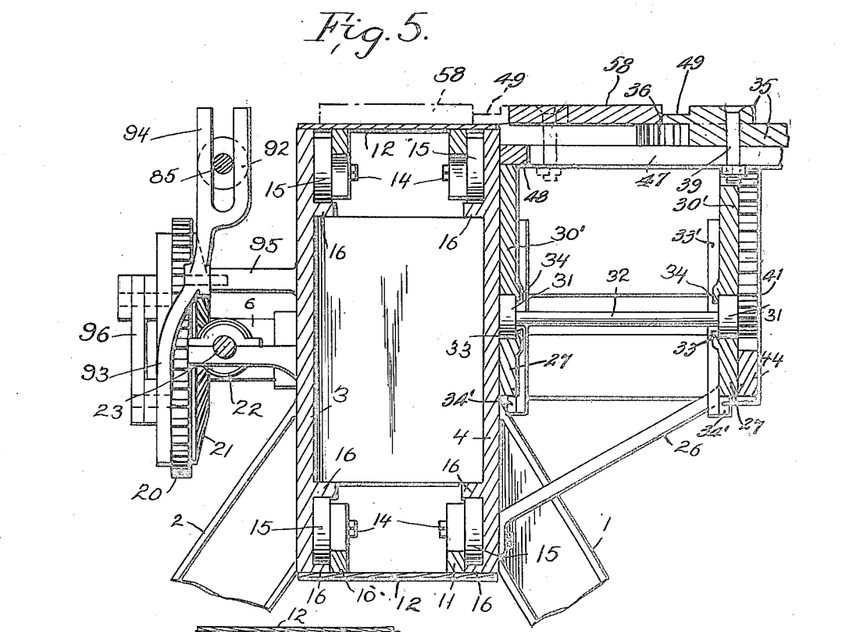
Figure 6:
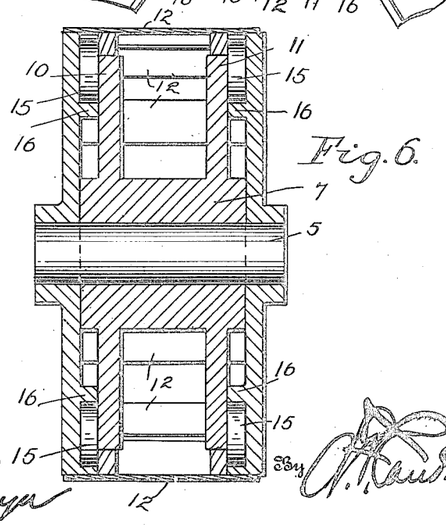
Fig. 6, is a detail cross sectional view through a part of the conveying structure.

The pallets, upon which the bricks are to be fed from the brick forming machine, are fed upon the endless conveyer structure 8 from one side of the same adjacent to the receiving end of the conveyer by a mechanism generically indicated by the numeral 25. The structure 25 is supported by suitable angle braces 26 which extend outwardly and upwardly from the side 4, the structure 25, includes a pair of rails 27, which are provided for supporting the wheels or rollers 31 of a car structure 30. The wheels 31 of the car structure 30 are mounted upon the usual type of axles 32 and the tracks 27 are provided with upstanding flanges 33 formed along their inner edges, which flanges overhang the rollers 33. The rollers 33 and the axle 32 are independent of the track and car structure 30, and the lower edges of the sides of the car ride upon the periphery of the rollers 31, being held in proper position thereon by flanges 34 which depend from the inner surface of the sides of the car 30 and overhang the rollers, as clearly shown in Fig. 5 of the drawings. The bars 33' are attached to the inner surfaces of the sides 30' of the car 30 and they extend downwardly, having rollers or lugs 34' carried by their lower ends which lugs or rollers engage the under surfaces of the rails 27 and prevent the car structure 30 from moving upwardly during its operation.

Figures 1, 9:
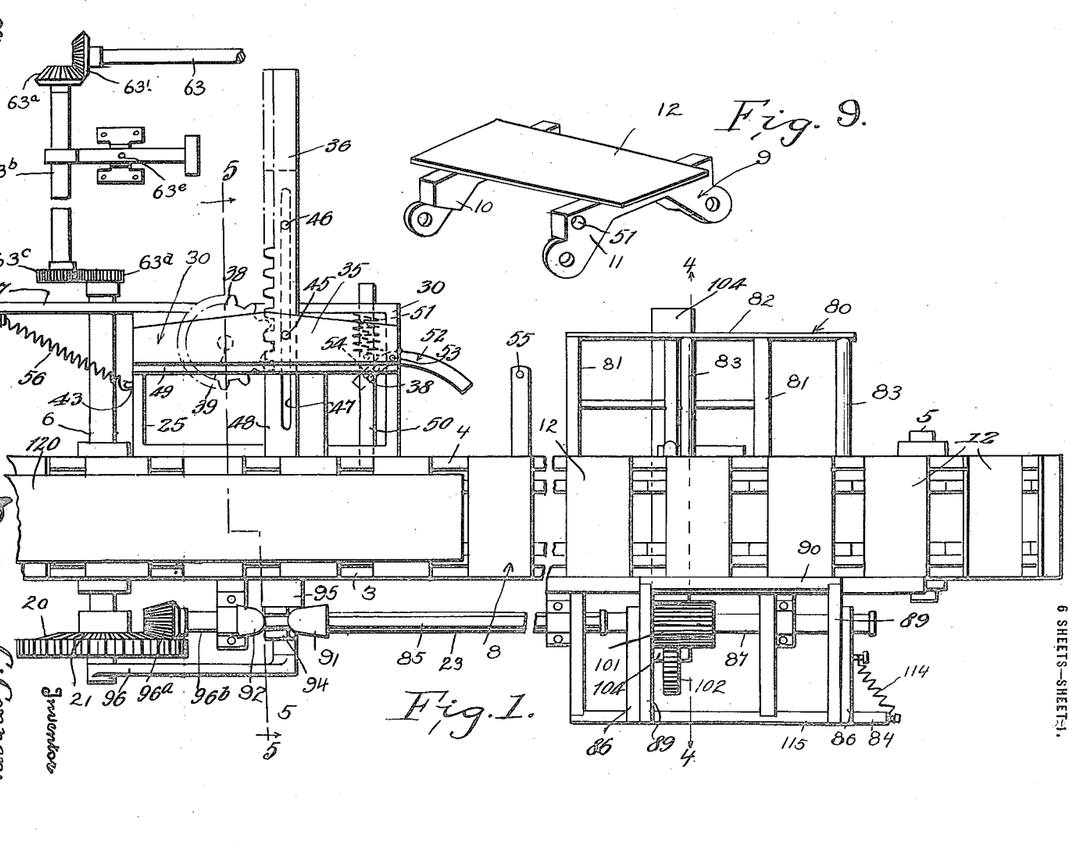
Figure 1 is a top plan view of the improved brick conveyer.
Fig. 9, is a perspective view of one of the links of the conveyer.
Figures 2, 7:
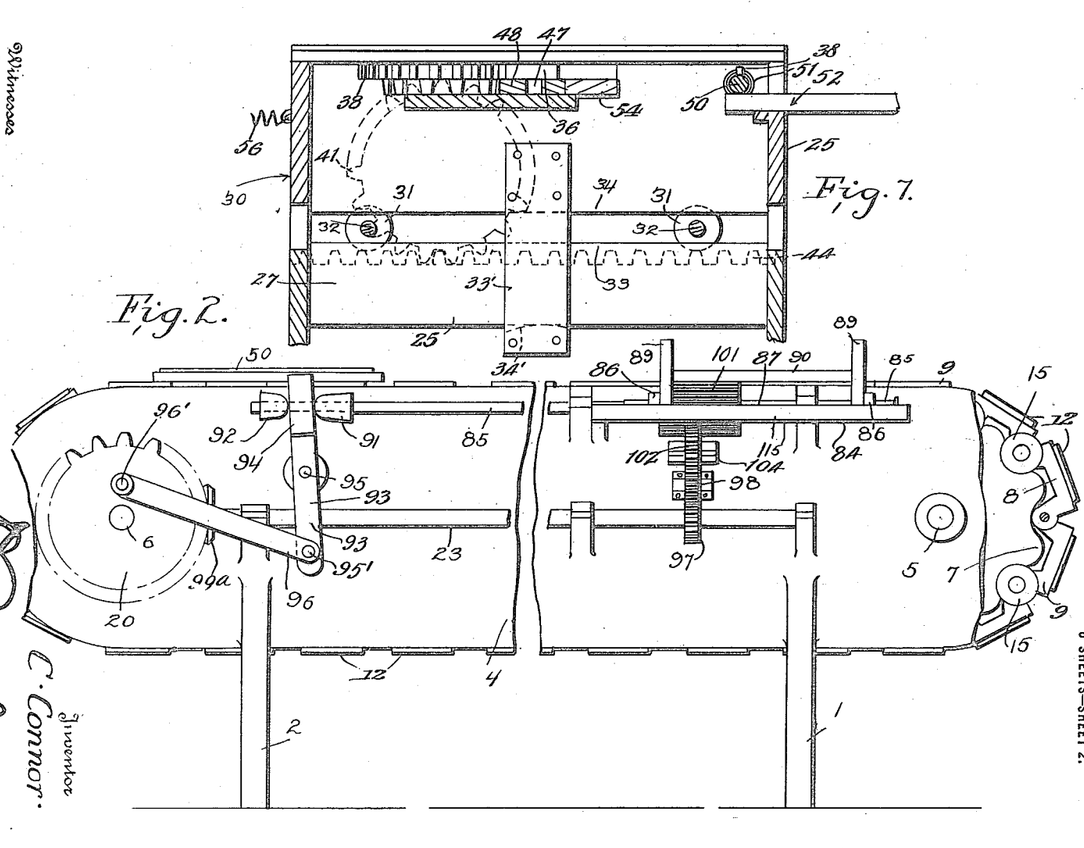
Fig. 2 is a side elevation of the conveyer.
Fig. 7, is a fragmentary view in section of the mechanism for feeding the pallets upon the conveyer preparatory to receiving the bricks thereupon.
Figures 3, 8:
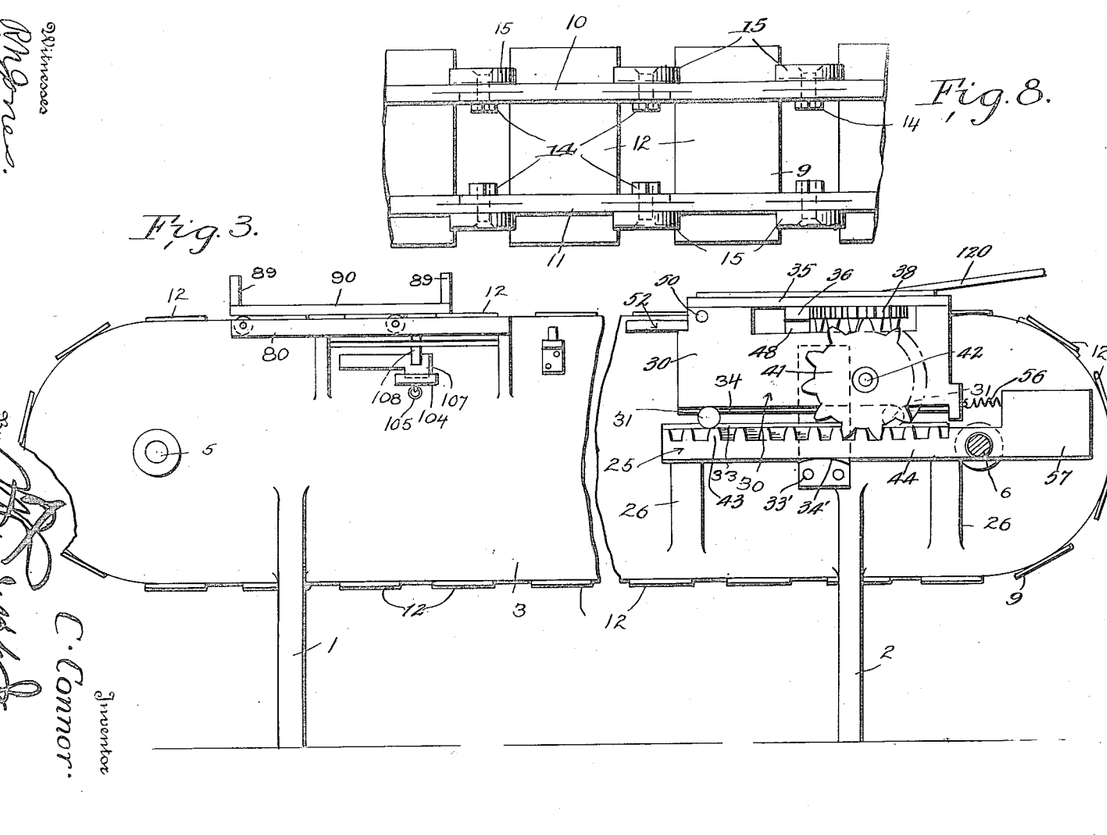
Fig. 3 is a side elevation of the conveyer looking in the direction opposite to that illustrated by Fig. 2 of the drawings.
Fig. 8, is a fragmentary bottom plan of a part of the conveyer.

A movable pallet feeding plate 35 is slidably carried by the car structure 30 and it moves transversely to the direction of movement of the car structure. The plate 35 has a rack bar 36 connected thereto, through the medium of which rack bar the plate 35 is moved over the upper surface of the car. A gear 38, which is rotatably mounted upon a vertical shaft 39, meshes with the rack bar 36 for moving the plate 35. The gear 38 has depending teeth 40 formed upon its under surface which mesh with the gear 41. The gear 41 meshes with the rack teeth 44 which are secured to the track structure, whereby the gears 38 and 41 will be rotated upon movement of the car structure with the conveyer for feeding a pallet upon the conveyer. The plate 35 is attached to the rack bar 36 by a bolt 45 and a second bolt 46 is carried by the rack bar. The bolts 45 and 46 travel in a slot 47 which is formed in a bar 48. The bar 48 is positioned below the rack bar and the bolts 45 and 46 traveling in the slot 47 will guide and also limit the movement of the rack bar 36 and the plate 35. The plate 35 has a recess or cutaway portion 49 formed in its upper surface at its forward edge, which cutout portion is provided for receiving the outermost edge of a brick carrying pallet. The car structures 30 is moved, synchronously with the movement of the endless conveyer 8, through the medium of a pin 50 which is slidably carried by the car structure and is normally forced inwardly so that its inner end will seat itself in openings 51 formed in certain of the links 11 of the chain, of the endless conveyer for connecting the car structure to the endless conveyer, by a spring 51 as indicated in Fig. 1 of the drawings. A pawl 52, is pivotally connected as shown at 53 to the car structure and has its inner end connected to the rod or pin 50 as shown at 54, the outer end of the pawl 52 is curved, for engagement with an upstanding pin 55. When the outwardly projecting end of the pawl 52 strikes the pin 55, the pawl will be rocked, owing to the engagement between the pawl and the pin during the longitudinal movement of the car structure 30, which rocking movement of the pawl will move the rod 50 outwardly and move its inner end out of one of the openings 51, thereby disconnecting the car structure from the endless conveyer. After the car structure has been disconnected from the endless conveyer, it is drawn back to its normal position, by the action of a contractile coil spring 56, which spring is stretched during the forward movement of the car structure. The spring 56 is connected to the car structure and to an arm 57 which projects outwardly from the lower rail 20 during the rearward or return movement of the car structure 30, under action of the spring 56, the gear 41 will be rotated, in a reverse direction to that in which it is rotated during the forward movement of the car, and it will, therefore impart a reverse rotation to the gears 38 and 41, which will move the rack 36 and the plate 35 outwardly away from the conveyer, and into a position for receiving blank or empty pallets and after the car has reached the limit of its return or rearward movement, the spring 51 will force the pin or rod 50 into one of the openings 51, formed in one of the links 11, which will again connect the rack to the conveyer and during the movement of the car structure with the endless conveyer, another pallet will be fed upon the endless conveyer by the inward movement toward the conveyer, of the plate 35 and the rack bar 36.

Figure 10:
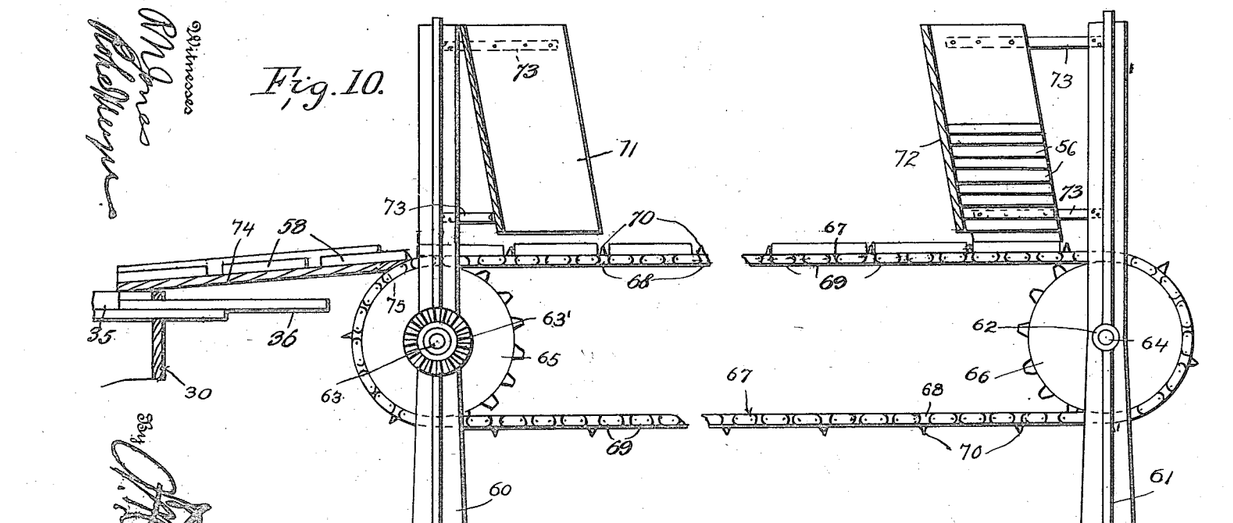
Fig. 10, is a view partly in side elevation and partly in section of the mechanism for feeding the pallets to the conveyer.
Figure 11:
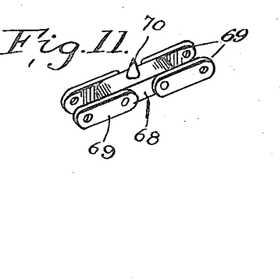
Fig. 11, is a perspective view of a part of the pallet feeding shed.
Figure 12:
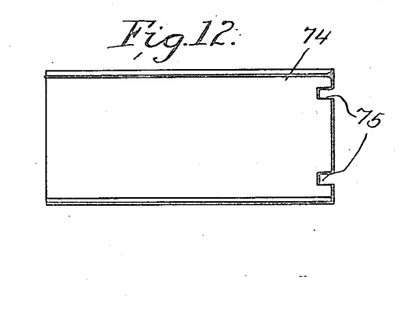
Fig. 12, is a top plan view of a guide for receiving the pallets from the automatic feeding mechanism and depositing them upon the conveyer.

The brick carrying pallets, indicated by the numeral 58 are delivered to the plate 35 by the mechanism illustrated in Figs. 10, 11 and 12 of the drawings.

The pallet feeding mechanism comprises: vertical standards 60 and 61 which have bearings 62 formed thereupon intermediate their ends, in which bearings are rotatably mounted shafts 63 and 64. The shafts 63 and 64 have sprockets 65 and 66 mounted thereon, about which sprocket chains 67 travel. The shaft 63 has a beveled gear 63' mounted thereon which meshes with a beveled gear 63$^a$, the beveled gear 63$^a$ is carried by a shaft 63$^b$, that is connected to the shaft 6 through the medium of ordinary gears 63$^d$ and 63$^e$ as clearly shown in Fig. 1 of the drawings. If it is so desired, a shifting lever as indicated at 63$^e$ may be attached to the shaft 63$^b$ for shifting the gears into or out of mesh.

The sprocket chains 57 are composed of alternating blocks or plates 68 which are connected by links 69. The blocks 68 are of greater thickness than the link 69 and they are secured to the links 69 in chain formation, as indicated in Fig. 11 of the drawings. Certain of the blocks 69 have upstanding pallet engaging tongues 70 formed thereon which tongues are provided for engaging pallets and holding them in the proper place upon the conveyer, which is composed of the sprocket chains 67. The pallets are deposited by the chains 67 upon a guiding platform 74, which guides the pallets over the upper surface of the rack 36 and the plates 35, positioning the pallets forwardly of the plates 35, when the latter is in its outermost position.

The standards 60 and 61 have secured thereto and positioned above the upper surface of the upper run of the chain 67, pallet guiding and retaining chutes 71 and 72. The chutes 71 and 72 are supported at inclines, by bracing arms 73, which bracing arms are secured to the standards 61 and 60 and project horizontally therefrom. The pallet retaining chutes 71 and 72 are positioned so that when the pallets are piled therein, they, the pallets, will be fed one at a time downwardly out of the lower open ends of the chutes upon the conveyer 57, which will carry them forwardly and pass them upon the guiding platform 74. The lower ends of the chutes 71 and 72 are positioned so that only a single pallet may pass beyond the forward edge of the same, by the action of travel of the conveyer 67, in this manner, the rear chute 72 will be emptied of pallets, contained therein prior to the feeding of the pallets from the front chute 71.

The guiding board 74 is provided with notches 75 formed therein, which receive the chains 67 during the travel of the chains downwardly about the sprocket 65. The pallet feeding mechanism heretofore described extends transversely to the conveyer structure proper and feeds the pallets from the back of the structure 25; the guiding board 74 over the bar 36 to the rear edge of the plate 35 as shown in Fig. 10 of the drawings.

The sides 4 of the supporting structure has a frame 80 secured thereto and extending transversely therefrom, adjacent the delivery end of the conveyer. The frame 80 comprises horizontal transversely extending bars 81 which have longitudinally extending bars 82 secured to their outer ends. Rollers 83 are carried by the bar 82 and the sides 4 as clearly shown in Fig. 1 of the drawings. The frame 80 is provided for receiving the loaded pallets from the conveyer structure 8 and the pallets are removed from the frame 80, by hand, and carried to a suitable drying shed of any ordinary type. Positioned directly opposite to the frame 80 and secured to the sides 3 of the supporting structure, is a second rack or supporting frame 84 which carries a mechanism for forcing a loaded pallet from the conveyer upon the frame 80. The frame 84 has a shaft 85 rotatably carried thereby, upon which shaft is mounted a sleeve 87. Arms 86 are secured to the sleeve 87, for swinging movement upon rotation of the sleeve. Arcuate arms 89 are pivotally connected, as shown at 88 to the outer free ends of the arms 86, and the forward ends of the arms 89 are connected by a bar 90, which is rectangular shaped in cross section and is adapted for sliding over the upper surface of the plate 12 of the conveyer structure 8 for forcing the pallets 58 off the conveyer structure upon the frame 80.

The shaft 85, upon which the sleeve 87 is mounted, extends longitudinally along the outer surface of the side 3 of the conveyer supporting structure and it has a pair of oppositely disposed cones 91 and 92 mounted thereupon, an arm 93 is pivotally supported, as indicated at 95 by the side 4 of the supporting frame and it has its upper end forked as indicated at 94. The upper forked end 94 spans or extends over the shaft 85 between the cones 91 and 92, so that upon pivotal movement of the lever 93 the shaft 85 will be shifted longitudinally. The lower end of the lever 93 is pivotally connected, as shown at 95' to an arm 96. The arm 96 is eccentrically connected, as indicated at 96' to the gear 20 so that during the rotation of the gear 20 the arm 93 will be rocked for shifting the shaft 85 longitudinally, the purpose of which will be hereinafter more fully described.

A beveled pinion 96ª meshes with the beveled teeth 21, of the gear 20. The beveled pinion 96ª is mounted upon a shaft 96ᵇ, which extends longitudinally along the supporting frame of the conveyer directly below the shaft 85, a gear 97 is mounted upon the shaft 96ᵇ, and meshes with a gear 98, which is carried by a stub shaft 99. The stub shaft 99 is rotatably supported by a suitable bearing bracket 100.

Figure 4:
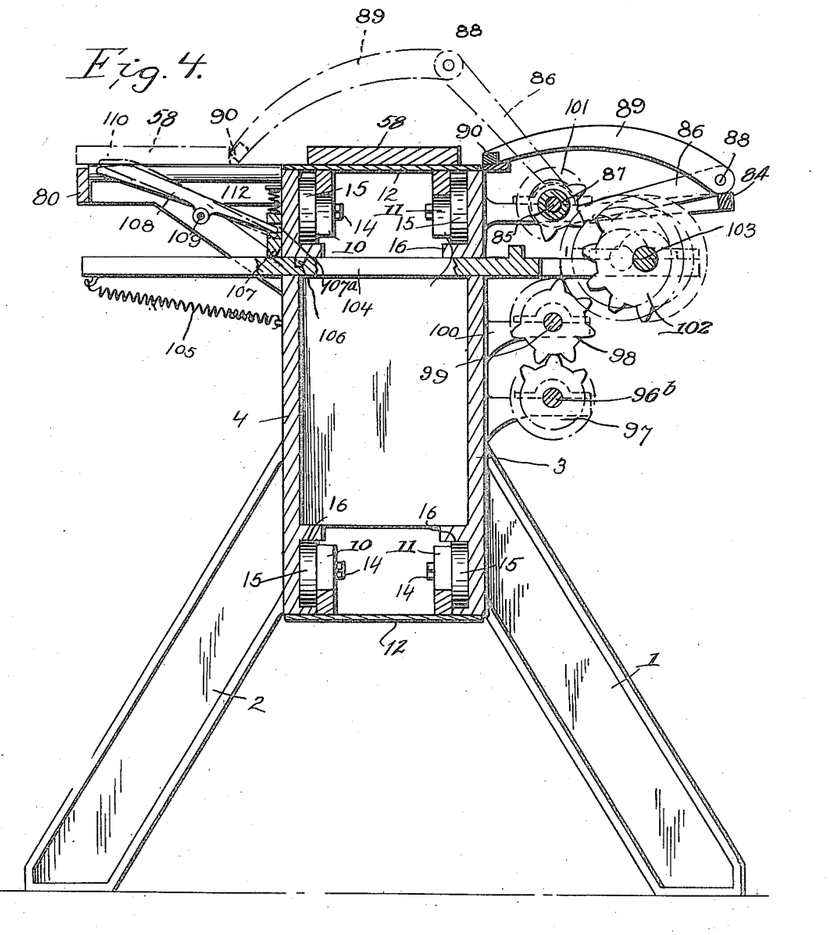
Fig. 4, is a cross sectional view on the line 4—4 of Fig. 1, Fig. 5, is a cross sectional view on the line 5—5 of Fig. 1 having the supporting legs of the machine broken away.

The sleeve 87, has an elongated pinion 101 mounted thereon, which pinion meshes with a gear 102. The gear 102 is mounted upon a shaft 103. The shaft 103 is rotatably carried by the outer end of a bar 104. The bar 104 extends through the sides 3 and 4 of the supporting structure and is slidably mounted therein as clearly shown in Fig. 4 of the drawings. The bar 104 projects out of the side 4 beneath the frame 80 and it has a contractile spring 105 secured thereto which spring is secured to the side 4 and tends to hold the gear 102 out of mesh with the gear 98 and also the pinion 101. When it is desired to rotate the shaft 95, the bar 104 is manually drawn outwardly against the tension of the spring 105 for moving the gear 102 into meshing engagement with the gear 98 and the pinion 101, which will rotate the pinion 101, and consequently the sleeve 87 and shaft 85, for moving the arms 86 and 89 into the position indicated in dot and dash lines in Fig. 4 of the drawings, for forcing a pallet 58 of the conveyer 8, upon the frame 80. The bar 104 is provided with notches 106 formed in its upper surface which are adapted for receiving the lower ends of a latch bolt 107. The latch bolt 107 is controlled by a spring 107' and it is provided with a recess 107ª into which the lower end of a pivoted arm 108 sits. The arm 108 is pivotally connected, as shown at 109 to the frame 80 and it extends upwardly therefrom, providing a flattened surface 110, which is engaged by a pallet 58, when the pallet is forced outwardly upon the frame 80, for rocking the lever 108 and consequently moving the latch 107 upwardly out of one of the notches 106, which releases the bar 104, allowing the spring 105 to act for moving the gear 102 out of making engagement with the gear 98 and the pinion 87. When the gear 102 is moved out of engagement with the pinion 101, it will allow the spring 114 to contract and return the arms 86 and 89 to their normal inoperative position, as shown in solid lines in Fig. 4 of the drawings, and into the position for forcing a pallet off the conveyer.

The operation of the improved brick spreading machine is as follows:

The pallets 58 are fed in front of the plate 35 by the conveyer 67, as previously described and the pallets are fed from the car structure 30 upon the plates 12 of the endless conveyer structure 8, during the travel of the car structure 30 with the conveyer structure as previously described. When a pallet is properly positioned on the conveyer 8, it is in position for receiving bricks from the delivery end of a rotary brick cutting or forming machine. The bricks issue from the brick forming machine in close proximity to each other, being separated only by the width of the cutting wires of the machine and they pass from the delivery end of the cutter over a guiding board or plate 120. The plate or guiding board 120 extends partially over the conveyer structure 8 and the conveyer structure is geared so that it will travel a little faster than the bricks travel over the plate or guiding board 120 so that the bricks delivered to the pallet upon the conveyer, from the plate 120 will be spaced, one-half an inch apart so as to allow for air circulation about the bricks, to facilitate their drying. The pallet moves slowly, with the conveyer, during the loading operation, and by the time it is loaded, a second pallet has been fed upon the conveyer by the plate 35 and the means for operating the same. The pallet which has been loaded with brick, travels along or with the conveyer 8 until it reaches the delivery end of the conveyer, or until it is directly between the frames 80 and 84. At this time, the operator who stands along side the frame 80 draws the bar 104 toward him, which moves the gear 102 into meshing engagement with the gear 8 and the pinion 101, thus rotating the sleeve 87, and moving the arms 86 and 89 upwardly so that they will slide the loaded pallet off the conveyer upon the frame 80. It will be remembered, that the pallet will be moving, continuously during the time it is being moved off the conveyer, by the arms 89 and to compensate for this movement, the lever 93, bar 96 and cones 91 and 92 are provided which owing to their connection to the gear 20, will shift the shaft 85, and the sleeve 87 carried by the shaft and also the gear 101 longitudinally in unison with the movement of the pallets upon the conveyer. The moving of the shaft 85 will move the arms 86 and 89, since they are carried by the sleeve 87. The pinion 101 is comparatively long, as will be seen by reference to the drawings, so that it will be meshing with the gear 102, during the longitudinal movement of the shaft.

The operation of the mechanism for forcing the pallet off the conveyer is manually controlled, so that the operator can operate the bar 104 at the proper time, so as to cause the frame 90 to move in the direction of travel of the pallet. When the loaded pallet has been forced off the conveyer upon the rollers 83, it will strike the flat end 110 of the lever 108, and rock the lever. The rocking of the lever 108 will move the latch 107 upwardly out of the recess 106, and release the bar 104 so that the contracting action of the spring 105 will force the gear 102 out of meshing engagement with the pinion 101 and arrest the forward forcing movement of the arms 86 and 89. The arms 86 and 89 will then be returned to their normal positions by the contracting action of the spring 114 and be in a position for forcing a second pallet off the conveyer, when the bar 104 is drawn toward the operator, for moving the gear 102 into meshing engagement with the gear 98 and the pinion 101.

If it is so desired, any number of pallet ejecting mechanisms and receiving platforms may be provided along the length of the endless conveyer, without departing from the spirit of this invention.

From the foregoing description taken in connection with the accompanying drawings the advantages of construction and of the method of operation of the improved spreading conveyers will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a brick conveyer structure, a conveyer, means for automatically feeding brick carrying pallets to said conveyer and means operated synchronously with the movement of said conveyer for forcing the pallets therefrom.

2. In a brick conveyer structure, the combination of a conveyer, means operable by the conveyer for automatically feeding brick carrying pallets upon said conveyer, and means for causing said brick carrying pallet feeding mechanism to move synchronously with the movement of said conveyer for a short distance.

3. In a brick conveyer structure, the combination of a conveyer, means operable by the conveyer for automatically feeding brick carrying pallets upon said conveyer, means for causing said brick carrying pallet feeding mechanism to move synchronously with the movement of said conveyer for a short distance, and means for automatically forcing said pallets from said conveyer.

4. In a brick conveyer structure, a conveyer, a supporting frame for said conveyer, a track supported transversely to one side of said conveyer supporting structure, a car mounted upon said track, means carried by said car for automatically feeding brick carrying pallets upon said conveyer, means for causing said car to move a short distance synchronously with the movement of said conveyer, and means for automatically releasing said last named means when a pallet has been fed upon said conveyer for permitting said car to return to its normal pallet receiving position.

5. In a brick conveyer structure, a conveyer, a supporting frame for said conveyer, a track supported transversely to one side of said conveyer supporting structure, a car mounted upon said track, means carried by said car for automatically feeding brick carrying pallets upon said conveyer, means for causing said car to move a short distance synchronously with the movement of said conveyer, and means for automatically releasing said last named means when a pallet has been fed upon said conveyer for permitting said car to return to its normal pallet receiving position, and means for automatically forcing the pallet from said conveyer.

6. In a brick conveyer structure, a conveyer, means for automatically feeding brick carrying pallets upon said conveyer, means for operating said conveyer, a supporting structure for said conveyer, a shaft supported by said supporting structure and extending longitudinally thereof, means for operating said shaft by said conveyer operating means, a frame supported transversely of said supporting structure, a shaft rotatably and slidably carried by said frame, a plurality of arms carried by said shaft for synchronous movement therewith, and means connecting said first named shaft and said second named shaft for rotating said second named shaft for moving said arms outwardly over said conveyer for forcing pallets therefrom.

7. In a brick conveyer structure, a supporting frame, a conveyer operatively carried by said supporting frame, means for operating said conveyer, a track supported transversely of said supporting frame, a car carried by said track, means carried by said car for automatically feeding brick carrying pallets upon said conveyer, means for causing said car to move synchronously with said conveyer for a short distance, and automatic means for releasing said car for independent movement of said conveyer for returning it to normal pallet receiving position, a shaft supported by said supporting structure and extending longitudinally thereof, a frame carried by said supporting structure and extending transversely therefrom and in a horizontal plane, a plurality of arms supported by said frame, and means connecting said shaft and said arms for moving said arms outwardly over said conveyer for forcing pallets from said conveyer.

In testimony whereof I affix my signature in presence of two witnesses.

CHARLES CONNOR.

Witnesses:
   Roy Bull,
   Herman Zarnecke.